(12) United States Patent
Wojciak et al.

(10) Patent No.: US 6,726,795 B1
(45) Date of Patent: Apr. 27, 2004

(54) RADIATION-CURABLE, CYANOACRYLATE-CONTAINING COMPOSITIONS

(76) Inventors: Stan Wojciak, 8 Janet Dr., New Britian, CT (US) 06053; Shabbir Attarwala, 191 Mohegan Dr., West Hartford, CT (US) 06117

( * ) Notice: Subject to any disclaimer, the term of this patent is extended or adjusted under 35 U.S.C. 154(b) by 0 days.

(21) Appl. No.: 10/078,005

(22) Filed: Feb. 20, 2002

Related U.S. Application Data

(63) Continuation of application No. 09/486,423, filed as application No. PCT/US98/03819 on Feb. 26, 1998, now Pat. No. 6,433,036, which is a continuation-in-part of application No. 08/805,193, filed on Feb. 27, 1997, now Pat. No. 5,922,783.

(51) Int. Cl.[7] .............................. C09J 4/00; B32B 31/00
(52) U.S. Cl. .............................. 156/275.5; 156/275.7; 522/17; 522/18; 522/26; 522/27; 522/28; 522/29; 522/116; 522/173; 428/1; 604/8; 604/19; 604/4.1; 359/642
(58) Field of Search .............................. 522/17, 18, 26, 522/27, 28, 29, 116, 173, 79; 156/275.5, 275.7; 428/1; 604/8, 19; 359/4.1, 642

(56) References Cited

U.S. PATENT DOCUMENTS

| | | | |
|---|---|---|---|
| 3,702,812 A | 11/1972 | McGinniss | 204/159.24 |
| 3,717,558 A | 2/1973 | McGinniss | 204/159.15 |
| 3,855,040 A | 12/1974 | Malofsky | 156/310 |
| 4,364,876 A | 12/1982 | Kimura et al. | 260/465.4 |
| 4,525,232 A | 6/1985 | Rooney et al. | 156/273.3 |
| 4,533,446 A | 8/1985 | Conway et al. | 204/159.24 |
| 4,690,957 A | 9/1987 | Fujioka et al. | 522/31 |
| 4,707,432 A | 11/1987 | Gatechair et al. | 430/281 |
| 4,818,325 A | * 4/1989 | Hiraiwa et al. | |
| 4,937,159 A | 6/1990 | Gottschalk et al. | 430/281 |
| 4,977,511 A | 12/1990 | Gottschalk et al. | 364/473 |
| 4,992,572 A | 2/1991 | Desobry et al. | 556/140 |
| 5,035,621 A | 7/1991 | Gottschalk et al. | 433/226 |
| 5,047,568 A | 9/1991 | Angelo et al. | 556/64 |
| 5,049,479 A | 9/1991 | Zertani et al. | 430/271 |
| 5,198,402 A | 3/1993 | Kaji et al. | 502/167 |
| 5,247,107 A | 9/1993 | Desobry et al. | 556/52 |
| 5,300,380 A | 4/1994 | Roth et al. | 430/18 |
| 5,525,698 A | 6/1996 | Bottcher et al. | 528/92 |
| 5,652,280 A | 7/1997 | Kutal | 522/66 |
| 5,691,113 A | 11/1997 | Kutal | 430/274.1 |
| 5,824,180 A | 10/1998 | Mikuni et al. | 156/275.3 |
| 5,846,685 A | 12/1998 | Pappas et al. | 430/156 |
| 5,877,230 A | 3/1999 | Kutal | 522/66 |
| 5,922,783 A | * 7/1999 | Wojciak | 156/275.5 |

FOREIGN PATENT DOCUMENTS

| | | | |
|---|---|---|---|
| EP | 393 407 | 10/1990 | C09J/163/00 |
| EP | 0 769 721 A1 * | 4/1997 | |
| EP | 1 124 159 A1 * | 8/2001 | |
| WO | WO 88/02879 | 4/1988 | |
| WO | WO 95/31486 | 11/1995 | C08F/2/50 |

OTHER PUBLICATIONS

H.V. Coover, D.W. Dreifus and J.T. O'Connor "Cyanoacrylate Adhesives" in *Handbook of Adhesives*, 27, 463–77, I. Skeist, ed., Van Nostrand Reinhold, New York, 3$^{rd}$ ed. (1990).

C. Kutal, P.A. Grutsch and D.B. Yang, "A Novel Strategy for Photoinitiated Anionic Polymerization", *Macromolecules*, 24, 6872–73 (1991).

J.G. Woods, "Radiation–Curable Adhesives" in *Radiation Curing: Science and Technology*, 333–98, 371, S.P. Pappas, ed., Plenum Press, New York (1992).

D. B. Yang and C. Kutal, "Inorganic and Organometallic Photoinitiators" in *Radiation Curing: Science and Technology*, 21–55, S.P. Pappas, ed., Plenum Press, New York (1992).

C. Kutal, B.J. Palmer and Y. Yamaguchi, "Ferrocenes as Anionic Photoinitiators", *Macromolecules*, 31, 5155–57 (1998).

H. J. Hageman in "Radiation Curing of Polymers II", ed. D.R. Randell, pp. 46–60, Royal Society of Chemistry Special Pub. No. 89, (1991).

* cited by examiner

*Primary Examiner*—Susan Berman
(74) *Attorney, Agent, or Firm*—Steven G. Bauman

(57) ABSTRACT

A radiation-curable composition which includes a cyanoacrylate component or a cyanoacrylate-containing formulation; a metallocene component; and a polymerizingly effective amount of a photoinitiator to accelerate the rate of cure is provided.

29 Claims, No Drawings

RADIATION-CURABLE, CYANOACRYLATE-CONTAINING COMPOSITIONS

RELATED APPLICATION DATA

This application is a continuation of U.S. patent application Ser. No. 09/486,423, filed Oct. 20, 1999 (now U.S. Pat. No. 6,433,036, issued Aug. 13, 2002), which is the U.S. National phase entry of International Patent Application No. PCT/US98/03819, filed Feb. 26, 1998, which is a continuation-in-part of U.S. patent application Ser. No. 08/805,193, filed Feb. 27, 1997 (now U.S. Pat. No. 5,922,783, issued Jul. 13, 1999).

BACKGROUND OF THE INVENTION

1. Field of the Invention

The present invention relates to a radiation-curable composition which includes a cyanoacrylate component or a cyanoacrylate-containing formulation, a metallocene component and a polymerizingly effective amount of a photoinitiator to accelerate the rate of cure.

2. Brief Description of Related Technology

Cyancacrylates generally are quick-setting materials which cure to clear, hard glassy resins, useful as sealants, coatings, and particularly adhesives for bonding together a variety of substrates [see e.g., H. V. Coover, D. W. Dreifus and J. T. O'Conner, "Cyanoacrylate Adhesives" in *Handbook of Adhesives*, 27, 463–77, I. Skeist, ed., Van Nostrand Reinhold, N.Y., 3rd ed. (1990)].

Ordinarily, upon contact with substrate materials possessing a surface nucleophile, cyanoacrylate-containing compositions spontaneously polymerize to form a cured material. The cured material exhibits excellent adhesive properties to materials such as metals, plastics, elastomers, fabrics, woods, ceramics and the like. Cyanoacrylate-containing compositions are thus seen as a versatile class of single-component, ambient temperature curing adhesives.

As noted, cyanoacrylate polymerization is typically initiated using a nucleophile. The cyanoacrylate anionic polymerization reaction proceeds until all available cyanoacrylate monomer has been consumed and/or terminated by an acidic species.

Although the predominant mechanism by which cyanoacrylate monomers undergo polymerization is an anionic one, free-radical polymerization is also known to occur in this regard under prolonged exposure to heat or light of an appropriate wavelength. See e.g., Coover et al., supra. Ordinarily, however, free-radical stabilizers, such as quinones or hindered phenols, are included in cyanoacrylate-containing adhesive formulations to extend their shelf life. Thus, the extent of any free-radical polymerization of commercial cyanoacrylate-containing compositions is typically minimal and in fact is especially undesirable for at least the reason stated.

With conventional polymerizable compositions other than those containing cyanoacrylate monomers, radiation cure generally presents certain advantages over other known cure methods. Those advantages include reduced cure time, solvent elimination (which thereby reduces environmental pollution, and conserves raw materials and energy) and inducement of low thermal stressing of substrate material. Also, room temperature radiation cure prevents degradation of certain heat sensitive polymers, which may occur during a thermal cure procedure.

Radiation-curable, resin-based compositions are legion for a variety of uses in diverse industries, such as coatings, printing, electronic, medical and general engineering. Commonly, radiation-curable compositions are used for adhesives, and in such use the resin may ordinarily be chosen from epoxy- or acrylate-based resins.

Well-known examples of radiation-curable, epoxy-based resins include cycloaliphatic and bisphenol-A epoxy resins, epoxidized novolacs and glycidyl polyethers. [See e.g., U.S. Pat. No. 4,690,957 (Fujiokau) and European Patent Publication EP 278 685.] The common cure mechanism for such radiation-curable epoxy-based compositions is reported to be cationic polymerization.

Well-known examples of radiation-curable, acrylate-based resins include those having structural backbones of urethanes, amides, imides, ethers, hydrocarbons, esters and siloxanes. [See e.g., J. G. Woods, "Radiation-Curable Adhesives" in *Radiation Curing: Science and Technology*, 333–98, 371, S. P. Pappas, ed., Plenum Press, New York (1992).] The common cure mechanism for such radiation-curable, acrylate-based compositions is free-radical polymerization.

European Patent Publication EP 393 407 describes a radiation-curable composition which includes a slow cure cationic polymerizable epoxide, a fast cure free radical polymerizable acrylic component and a photoinitiator. Upon exposure to radiation, the photoinitiator is said to be capable of generating a cationic species which is capable of initiating polymerization of the epoxide and a free radical species which is capable of initiating polymerization of the acrylic component. The polymerizable acrylic component includes monofunctional acrylates and acrylate esters, such as cyano-functionalized acrylates and acrylate esters, examples of which are expressed as 2-cyanoethyl acrylate ($CH_2$=$CHCOOCH_2CH_2CN$) and 3-cyanopropyl acrylate ($CH_2$=$CHCOOCH_2CH_2CH_2CN$). (See page 5, lines 19–26.) The photoinitiator includes onium salts of Group Va, VIa and VIIa as well as iron-arene complexes, and generally metallocene salts, provided that the material chosen as the photoinitiator is said to be one which is capable of generating both a cationic species and a free radical species upon exposure to radiation. (See page 5, line 56–page 7, line 15.)

Other reported information regarding photopolymerizable compositions includes formulations containing epoxy compounds and metal complexes, such as disclosed in U.S. Pat. No. 5,525,698 (Böttcher).

U.S. Pat. No. 4,707,432 (Gatechair) speaks to a free radical polymerizable composition which includes (a) polymerizable partial esters of epoxy resins and acrylic and/or methacrylic, and partial esters of polyols and acrylic acid and/or methacrylic acid, and (b) a photoinitiator blend of a cyclopentadienyl iron complex and a sensitizer or photoinitiator, such as an acetophenone.

In D. B. Yang and C. Kutal, "Inorganic and organometallic Photoinitiators" in *Radiation Curing. Science and Technology*, 21–55, S. P. Pappas, ed., Plenum Press, New York (1992), cyclopentadienyl transition metal complexes are discussed with attention paid to ferrocene and titanocene. In the absence of halogenated media, Yang and Kutal report that ferrocene is photoinert, though in the presence of such media and a vinyllic source free radical initiated polymerization may occur.

And in C. Kutal, P. A. Grutsch and D. B. Yang, "A Novel Strategy for Photoinitiated Anionic Polymerization", Macromolecules, 24, 6872–73 (1991), the authors note that "[c]onspicuously absent from the current catalogue of photoinitiators are those that undergo photochemical release of an anionic initiating species." The authors also note that ethyl cyanoacrylate is "unaffected by prolonged (24-h) irradiation with light of wavelength >350 nm" whereas in the presence of NCS$^+$, cyanoacrylate is observed to solidify immediately, generating heat in the process. Though the NCS$^-$ was not in that case generated as a result of irradiation, it was generated from the Reineckate anion upon ligand field excitation thereof with near-ultraviolet/visible light.

While metallocenes (such as ferrocenes) have been employed in acrylate-based anaerobic adhesive compositions [see e.g., U.S. Pat. No. 3,855,040 (Malofsky), U.S. Pat. No. 4,525,232 (Rooney), U.S. Pat. No. 4,533,446 (Conway) and EP '407], it is not believed that to date a cyanoacrylate-based adhesive composition has been developed including therein a metallocene as defined herein, particularly with respect to curing through a photoinitiated mechanism.

Accordingly, a photocurable composition including a cyanoacrylate component, a metallocene component and a photoinitiator component would be desirable as possessing the benefits and advantages of cyanoacrylate-containing compositions while curing through at least a photo-induced polymerization mechanism.

SUMMARY OF THE INVENTION

The present invention meets the desire expressed above by providing compositions which include a cyanoacrylate component or a cyanoacrylate-containing formulation, a metallocene component and a photoinitiator. Desirably, such compositions are curable after exposure to radiation in the electromagnetic spectrum. Accordingly, in such radiation or photocurable compositions a polymerizingly effective amount of a photoinitiator should be used.

The photocurable compositions of this invention retain those benefits and advantages of traditional cyanoacrylate-containing compositions while curing through at least a photo-induced polymerization mechanism, thereby providing to the compositions (and cured reaction products formed therefrom) the benefits and advantages of curing through such a mechanism. More specifically, photocurable compositions according to this invention cure rapidly, and in so doing minimize the opportunity for undesirable blooming or crazing formation in the cured reaction product.

In another aspect of the present invention, there is provided a method of polymerizing a photocurable composition by providing an amount of the composition to a desired surface and exposing the composition to radiation in an amount sufficient to effect cure thereof.

In yet another aspect of the present invention, there is provided the cured reaction product formed from a photocurable composition after exposure thereof to a curingly effective amount of radiation.

The present invention will be more readily appreciated by those persons of skill in the art based on a reading of the detailed description of the invention which follows and the examples presented thereafter for illustrative purposes.

DETAILED DESCRIPTION OF THE INVENTION

This invention relates to photocurable compositions which include a cyanoacrylate component or a cyanoacrylate-containing formulation, a metallocene component and a polymerizingly effective amount of a photoinitiator.

The cyanoacrylate component or cyanoacrylate-containing formulation includes cyanoacrylate monomers which may be chosen with a raft of substituents, such as those represented by $H_2C=C(CN)$—COOR, where R is selected from $C_{1-5}$, alkyl, alkoxyalkyl, cycloalkyl, alkenyl, aralkyl, aryl, allyl and haloalkyl groups. Desirably, the cyanoacrylate monomer is selected from methyl cyanoacrylate, ethyl-2-cyanoacrylate, propyl cyanoacrylates, butyl cyanoacrylates, octyl cyanoacrylates, allyl-2-cyanoacrylate, β-methoxyethyl-2-cyanoacrylate and combinations thereof. A particularly desirable cyanoacrylate monomer for use herein is ethyl-2-cyanoacrylate.

A variety of organometallic materials are also suitable for use herein. Those materials of particular interest herein may be represented by metallocenes within structure I:

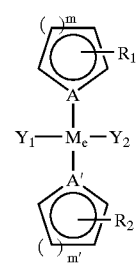

where
- $R_1$ and $R_2$ may be the same or different and may occur at least once and up to as many as four times on each ring in the event of a five-membered ring and up to as many as five times on each ring in the event of a six-membered ring;
- $R_1$ and $R_2$ may be selected from H; any straight- or branched-chain alkyl constituent having from 1 to about 8 carbon atoms, such as $CH_3$, $CH_2CH_3$, $CH_2CH_2CH_3$, $CH(CH_3)_2$, $C(CH_3)_3$ or the like; acetyl; vinyl; allyl; hydroxyl; carboxyl; —$(CH_2)_n$—OH, where n may be an integer in the range of 1 to about 8; —$(CH_2)_n$—$COOR_3$, where n may be an integer in the range of 1 to about 8 and $R_3$ may be any straight- or branched-chain alkyl constituent having from 1 to about 8 carbon atoms; H; Li; Na; or —$(CH_2)_{n'}$, where n' may be an integer in the range of 2 to about 8; —$(CH_2)_n$—$OR_4$, wherein n may be an integer in the range of 1 to about 8 and $R_4$ may be any straight- or branched-chain alkyl constituent having from 1 to about 8 carbon atoms; or —$(CH_2)_n$—$N'(CH_3)_3$ $X^-$, where n may be an integer in the range of 1 to about 8 and X may be $Cl^-$, $Br^-$, $I^-$, $ClO_4^-$ or $BF_4^-$;
- $Y_1$ and $Y_2$ may not be present at all, but when at least one is present they may be the same or different and may be selected from H, $Cl^-$, $Br^-$, $I^-$, cyano, methoxy, acetyl, hydroxy, nitro, trialkylamines, triaryamines, trialkylphospines, triphenylamine, tosyl and the like;
- A and A' may be the same or different and may be C or N;
- m and m' may be the same or different and may be 1 or 2; and
- $M_e$ is Fe, Ti, Ru, Co, Ni, Cr, Cu, Mn, Pd, Ag, Rh, Pt, Zr, Hf, Nb, V, Mo and the like.

Of course, depending on valence state, the element represented by $M_e$ may have additional ligands—$Y_1$ and $Y_2$—associated therewith beyond the carbocyclic ligands depicted above (such as where $M_e$ is Ti and $Y_1$ and $Y_2$ are $Cl^-$).

Alternatively, metallocene structure I may be modified to include materials such as:

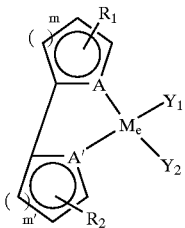

where $R_1$, $R_2$, $Y_1$, $Y_2$, A, A', m, m' and $M_e$ are as defined above. A particularly desirable example of such a material is where $R_1$ and $R_2$ are each H; $Y_1$ and $Y_2$ are each Cl; A and A' are each N; m and m' are each 2 and $M_e$ is Ru.

Within metallocene structure I, well-suited metallocene materials may be chosen from within metallocene structure II:

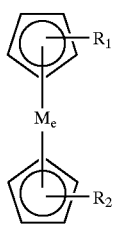

II where $R_1$, $R_2$ and $M_e$ are as defined above.

Particularly well-suited metallocene materials from within structure I may be chosen where $R_1$, $R_2$, $Y_1$, $Y_2$, m and m' are as defined above, and $M_e$ is chosen from Ti, Cr, Cu, Mn, Ag, Zr, Hf, Nb, V and Mo.

Desirably, the metallocene is selected from ferrocenes (i.e., where $M_e$ is Fe), such as ferrocene, vinyl ferrocenes, ferrocene derivatives, such as butyl ferrocenes or diarylphosphino metal-complexed ferrocenes [e.g., 1,1-bis (diphenylphosphino) ferrocene-palladium dichloride], titanocenes (i.e., where $M_e$ is Ti), such as bis($\eta^5$-2,4-cyclopentadien-1-yl)-bis-[2,6-difluoro-3-(1H-pyrrol-1-yl) phenyl] titanium which is available commercially from Ciba-Geigy Corporation, Tarrytown, N.Y. under the tradename "IRGACURE" 784DC, and derivatives and combinations thereof. A particularly desirable metallocene is ferrocene.

And bis-alkylmetallocenes, for instance, bis-alkylferrocenes (such as diferrocenyl ethane, propanes, butanes and the like) are also desirable for use herein, particularly since about half of the equivalent weight of the material (as compared to a non-bis-metallocene) may be employed to obtain the sought-after results, all else being unchanged. Of these materials, diferrocenyl ethane is particularly desirable.

Of course, other materials may be well-suited for use as the metallocene component. For instance, $M_e[CW_3—CO—CH=C(O^-)—CW'_3]_2$, where $M_e$ is as defined above, and W and W' may be the same or different and may be selected from H, and halogens, such as F and Cl. Examples of such materials include platinum (II) acetyl acetonate ("PtACAC"), cobalt (II) acetyl acetonate ("CoACAC"), nickel (II) acetyl acetonate ("NiACAC") and copper (II) acetyl acetonate ("CuACAC"). Combinations of those materials may also be employed.

A number of photoinitiators may be employed herein to provide the benefits and advantages of the present invention to which reference is made above. Photoinitiators enhance the rapidity of the curing process when the photocurable compositions as a whole are exposed to electromagnetic radiation. Certain metallocenes, such as "IRGACURE" 784DC, may serve a dual purpose as both metallocene and photoinitiator.

Examples of suitable photointiators for use herein include, but are not limited to, photoinitiators available commercially from Ciba-Geigy Corp., Tarrytown, N.Y. under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl)phosphine oxide and 2-hydroxy-2-methyl-1-phenyl-propan-1-one), and 819 [bis(2,4,6-trimethyl benzoyl)phenyl phosphine oxide] and "DAROCUR" 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); and the visible light [blue] photoinitiators, dl-camphorquinone and "IRGACURE" 784DC. Of course, combinations of these materials may also be employed herein.

Other photoinitiators useful herein include alkyl pyruvates, such as methyl, ethyl, propyl, and butyl pyruvates, and aryl pyruvates, such as phenyl, benzyl, and appropriately substituted derivatives thereof.

Photoinitiators particularly well-suited for use herein include ultraviolet photoinitiators, such as 2,2-dimethoxy-2-phenyl acetophenone (e.g., "IRGACURE" 651), and 2-hydroxy-2-methyl-1-phenyl-1-propane (e.g., "DAROCUR" 1173), bis(2,4,6-trimethyl benzoyl)phenyl phosphine oxide (e.g., "IRGACURE" 819), and the ultraviolet/visible photoinitiator combination of bis(2,6-dimethoxybenzoyl-2,4-,4-trimethylpentyl)phosphine oxide and 2-hydroxy-2-methyl-1-phenyl-propan-1-one (e.g., "IRGACURE" 1700), as well as the visible photoinitiator bis($\eta^s$-2,4-cyclopentadien-1-yl)-bis[2,6-difluoro-3-(1H-pyrrol-1-yl)phenyl]titanium (e.g., "IRGACURE" 784DC).

With respect to formulating photocurable compositions, generally the components may be introduced to one another in any convenient order. Alternatively, it may be desirable to prepare a premix of the metallocene component and the photoinitiator component. In this way, a ready made premix of those components may be added to the cyanoacrylate component of the formulation to allow for a quick and easy one-part formulation of a photocurable composition prior to dispensing and curing thereof.

For packaging and dispensing purposes, it may be desirable for photocurable compositions in accordance with the present invention to be relatively fluid and flowable. Variations in the viscosity thereof may also be desirable in certain applications and may be readily achieved through routine changes in formulation, the precise changes being left to those persons of ordinary skill in the art.

For instance, ordinarily cyanoacrylate-containing compositions free from an added thickener or viscosity modifier are low viscosity formulations (such as in the range of 1 to 3 cps). While a composition with such a is viscosity (or one whose viscosity has been modified to be up to about five times that viscosity) may be appropriate for a wicking application where a small gap exists between substrates to be bound (e.g., less than about 0.1 mils) and/or an application where enhanced cure speed is desirable, such a viscosity may be too low for convenient use in certain industrial applications. At least for this reason, the viscosity of cyanoacrylate-containing compositions has at times been desirably modified through, for instance, the addition of polymethylmethacrylates and/or fumed silicas. See e.g., U.S. Pat. No. 4,533,422 (Litke) and Re. 32,889 (Litke), the disclosures of each of which are hereby expressly incorporated herein by reference.

A medium viscosity formulation (such as in the range of 100 to 300 cps) may be more appropriate in applications where greater control of flowability is desirable such as bonding together molded polymeric parts. And a high viscosity formulation (such as in the range of 600 to 1000 cps) may be more appropriate in applications involving porous substrates and/or substrates with larger gaps (such as greater than about 0.5 mils).

Of course, those of ordinary skill in the art should make appropriate decisions regarding whether a viscosity modifier should be included in the photocurable composition, and if so which one(s) and at what level should one be included to achieve the desired viscosity for the intended applications.

In addition, it may be desirable to toughen the cured photocurable compositions of the present invention through the addition of elastomeric rubbers such as is taught by and claimed in U.S. Pat. No. 4,440,910 (O'Connor), the disclosure of which is hereby expressly incorporated herein by reference. It may also be desirable to improve the hot strength of the cured photocurable compositions by addition of anhydrides, such as is taught by and claimed in U.S. Pat. No. 4,450,265 (Harris) and the documents cited therein, the disclosures of each of which are hereby expressly incorporated herein by reference.

Moreover, the compositions of the present invention may be rendered into a thixotropic paste through addition of powdered organic fillers having a particle size of about 2 to 200 microns as is taught by U.S. Pat. No. 4,105,715 (Gleave) or thickened by a copolymer or terpolymer resin to improve peel strength as is taught by U.S. Pat. No. 4,102,945 (Gleave), the disclosures of each of which are hereby incorporated herein by reference.

Further, the compositions of the present invention may be rendered more resistant to thermal degradation at elevated temperature conditions by the inclusion of certain sulfur-containing compounds, such as sulfonates, sulfinates, sulfates and sulfites as set forth in U.S. Pat. No. 5,328,944 (Attarwala), the disclosure of which is hereby expressly incorporated herein by reference. The inclusion of such compounds in the photocurable compositions of the present invention renders those compositions well-suited for applications in which elevated temperature conditions may be experienced, such as with potting compounds particularly where large cure through volume is present and non-tacky surfaces are desirably formed in less than about five seconds.

The sulfur-containing compounds effective for enhancing the thermal resistance of the cured cyanoacrylate polymer may be represented according to the formula:

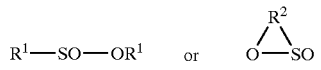

-continued

where $R^1$ and $R^2$ are, respectively, monovalent and divalent hydrocarbon groups which may be optionally substituted with halogen, $NO_2$, oxo (=O), CN, alkoxy, hydroxy, acyloxy or $SO_2$ or interrupted by one or more ether oxygen atoms.

The sulfur-containing compounds are suitably employed at levels of about 0.1–10% by weight of the inventive composition.

More specifically, the thermal resistance conferring compound used in the inventive compositions, include by way of example, acyclic and cyclic sulfates, such as diphenyl sulfate, dibutyl sulfate; and compounds, such as 1,3,2-dioxathiolene-4-ethyl-2,2-dioxide and the di(cyclic sulfate) of 1,2,7,8-octane tetraol which have one or more groups of the formula:

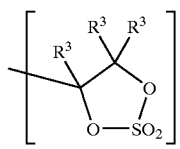

where $R^3$ is independently H, alkyl or aryl; anhydrosulfites, such as α-hydroxyisobutynic acid anhydrosulfite; sulfoxides such as dibutylsulfoxide, di-α,α'-phenylethylsulfoxide and α-methylthioxo-butyrolactone; sulfites such as glycol sulfite, dimethyl sulfite diethyl sulfite and o-phenylene sulfite; sulfonates, such as ethyl methanesulfonate, ethyl trifluoromethane sulfonate, methyl p-toluenesulfonate, n-butyl p-toluenesulfonate, benzyl p-toluenesulfonate, α-methylbenzyl p-toluenesulfonate, α,α-dimethylbenzyl p-toluenesulfonate and the diethyl ester of acetone disulfonic acid; and sulfinates such as methyl-p-toluenesulfonate.

These compounds are usefully employed at levels in the range of about 0.1%–10% by weight of the inventive composition, preferably at least 0.5% and more typically about 0.75%–5% by weight of the inventive composition.

The inclusion of such materials to a photocurable composition in accordance with the present invention may provide a formulation having particular advantages for certain applications, and at least in the case of viscosity modifiers should be appealing from a safety perspective as the possibility is decreased of splashing or spilling the composition on exposed skin of the user or bystanders. In addition, since the parts to be bonded with the inventive compositions are fixed by exposure to UV radiation, there is less of a chance for the assembler to touch or contact an uncured fillet.

The relative amount of the various components of the photocurable compositions according to this invention is a matter of choice left to those persons of skill in the art, depending of course on the identity of the particular components chosen for a specific composition. As a general guide, however, it is desirable to include in the photocurable compositions a metallocene, such as ferrocene, in an amount within the range of about 0.005% to about 4% or greater (desirably within the range of about 0.01% to about 1.5%) by weight of the total composition. It is also desirable for the compositions to include a photoinitiator, such as "IRGACURE" 1700 or 819, or "DAROCUR" 1173, in an amount

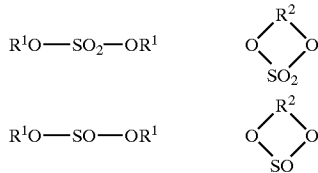

within the range of about 0.125% to about 10% by weight of the composition, with about 2% to about 4% or greater by weight of the total composition being desirable. The balance of the composition is composed predominantly of a cyanoacrylate component, such as ethyl-2-cyanoacrylate. Of course, the amount of all the components together in the composition totals 100%.

A method of curing a photocurable composition in accordance with this invention is also provided herein, the steps of which include (a) providing onto a desired substrate an amount of a photocurable composition; and (b) subjecting the composition to radiation sufficient to effect cure thereof.

The amount of photocurable composition provided should be sufficient to cure and form an adequate bond to the substrate surfaces between which it is applied. For instance, application of the photocurable composition may he achieved by dispensing the composition in drop-wise fashion, or as a liquid stream, brush-applied, dipping, and the like, to form a thin film. Application of the photocurable composition may depend on the flowability or viscosity of the composition. To that end, viscosity modifiers, as noted above, may be included in the composition.

In use, such compositions are desirably readily dispensed onto a portion of a desired surface of a substrate onto which is to be bonded a portion of another substrate. The photocurable composition may be applied to certain portions of the substrate surface or over the entire surface of the substrate to be bonded, depending on the particular application.

The source of radiation emitting electromagnetic waves is selected from ultraviolet light, visible light, electron beam, x-rays, infrared radiation and combinations thereof. Desirably, ultraviolet light is the radiation of choice, with appropriate sources including "H", "D", "V", "X", "M" and "A" lamps, mercury arc lamps, and xenon arc lamps (such as those commercially available from Loctite Corporation, Rocky Hill, Conn., Fusion UV Curing Systems, Buffalo Grove, Ill. or Spectroline, Westbury, N.Y.); microwave-generated ultraviolet radiation; solar power and fluorescent light sources. Any of these electromagnetic radiation sources may use in conjunction therewith reflectors and/or filters, so as to focus the emitted radiation onto a specific portion of a substrate onto which has been dispensed a photocurable composition and/or within a particular region of the electromagnetic spectrum. Similarly, the electromagnetic radiation may be generated directly in a steady fashion or in an intermittent fashion so as to minimize the degree of heat build-up. Although the electromagnetic radiation employed to cure the photocurable compositions into desired reaction products is often referred to herein as being in the ultraviolet region, that is not to say that other radiation within the electromagnetic spectrum may not also be suitable. For instance, in certain situations, radiation in the visible region of the electromagnetic spectrum may also be advantageously employed, whether alone or in combination with, for instance, radiation in the ultraviolet region. Of course, microwave and infrared radiation may also be advantageously employed under appropriate conditions.

Higher or lower radiation intensities, greater or fewer exposures thereto and length of exposure and/or greater or lesser distances of the source of radiation to the composition may be required to complete curing, depending of course on the particular components of a chosen composition.

More specifically with respect to radiation intensity, the chosen lamp should have a power rating of at least about 100 watts per inch (about 40 watts per cm), with a power rating of at least about 300 watts per inch (about 120 watts per cm) being particularly desirable. Also, since the inclusion of a photoinitiator in the composition may shift the wavelength within the electromagnetic radiation spectrum at which cure occurs, it may be desirable to use a source of electromagnetic radiation whose variables (e.g., wavelength, distance, and the like) are readily adjustable.

During the curing process, the composition will be exposed to a source of electromagnetic radiation that emits an amount of energy, measured in $KJ/m^2$, determined by parameters including: the size, type and geometry of the source; the duration of the exposure to electromagnetic radiation; the intensity of the radiation (and that portion of radiation emitted within the region appropriate to effect curing); the absorbency of electromagnetic radiation by any intervening materials, such as substrates; and the distance the composition lies from the source of radiation. Those persons of skill in the art should readily appreciate that curing of the composition may be optimized by choosing appropriate values for these parameters in view of the particular components of the composition.

To effect cure, the source of electromagnetic radiation may remain stationary while the composition passes through its path. Alternatively, a substrate coated with the photocurable composition may remain stationary while the source of electromagnetic radiation passes thereover or therearound to complete the transformation from composition to reaction product. Still alternatively, both may traverse one another, or for that matter remain stationary, provided that the photocurable composition is exposed to electromagnetic radiation sufficient to effect cure.

Commercially available curing systems, such as the "ZETA" 7200 or 7400 ultraviolet curing chamber (Loctite Corporation, Rocky Hill, Conn.), Fusion UV Curing Systems F-300 B (Fusion UV Curing Systems, Buffalo Grove, Ill.), Hanovia UV Curing System (Hanovia Corp., Newark, N.J.), BlackLight Model B-100 (Spectroline, Westbury, N.Y.) and RC500 A Pulsed UV Curing System (Xenon Corp., Woburn, Mass.), are well-suited for the purposes described herein. Also, a Sunlighter UV chamber fitted with low intensity mercury vapor lamps and a turntable may be employed herein.

The required amount of energy may be delivered by exposing the composition to a less powerful source of electromagnetic radiation for a longer period of time, through for example multiple passes, or alternatively, by exposing the composition to a more powerful source of electromagnetic radiation for a shorter period of time. In addition, each of those multiple passes may occur with a source at different energy intensities. In any event, those persons of skill in the art should choose an appropriate source of electromagnetic radiation depending on the particular composition, and position that source at a suitable distance therefrom which, together with the length of exposure, optimizes transformation. Also, it may be desirable to use a source of electromagnetic radiation that is delivered in an intermittent fashion, such as by pulsing or strobing, so as to ensure a thorough and complete cure without causing excessive heat build-up.

In use, a photocurable composition in accordance with the present invention may be dispensed, such as in the form of a thin film or droplet, onto a desired substrate. Substrates onto which the photocurable composition of the present invention may be applied may be chosen from a vast selection of different materials; basically, any material with which cyanoacrylates may be used is suitable as well for use herein. See supra.

Desirable choices among such materials include acrylics, epoxies, polyolefins, polycarbonates, polysulfones (e.g., polyether sulfone), polyvinyl acetates, polyamides, polyetherimides, polyimides and derivatives and co-polymers thereof with which may be blended or compounded traditional additives for aiding processibility or modifying the physical properties and characteristics of the material to be used as a substrate. Examples of co-polymers which may be employed as substrates include acrylonitrile-butadiene-styrene, styrene-acrylonitrile cellulose, aromatic copolyesters based on terephthallic acid, p,p-dihydroxybiphenyl and p-hydroxy benzoic acid, polyalkylene (such as polybutylene or polyethylene)terephthalate, polymethyl pentene, polyphenylene oxide or sulfide, polystyrene, polyurethane, polyvinylchloride, and the like. Particularly, desirable co-polymers include those which are capable of transmitting UV and/or visible radiation. Of course, other materials may also be employed as substrates, such as metals, like stainless steel.

The composition-coated substrate may be positioned within an electromagnetic radiation curing apparatus, such as the "ZETA" 7200 ultraviolet curing chamber, equipped with an appropriate source of electromagnetic radiation, such as ultraviolet radiation, at an appropriate distance therefrom, such as within the range of about 1 to 2 inches (2.54 to 5.08 cm), with about 3 inches (7.62 cm) being desirable. As noted above, the composition-coated substrate may remain in position or may be passed thereunder at an appropriate rate, such as within the range of about 1 to about 60 seconds per foot, with about 5 seconds per foot being desirable. Such passage may occur one or more times, or as needed to effect cure of the composition on the substrate. The length of exposure may be in the range of a few seconds or less (for one time exposure) to tens of seconds or longer (for either a one time exposure or a multiple pass exposure) if desired, depending on the depth of the composition to be cured and of course on the components of the composition themselves.

A reaction product is also of course provided by the teaching of this invention. The reaction product is formed from photocurable compositions after exposure thereof to electromagnetic radiation sufficient to effect cure of the composition. The reaction product is formed rapidly, and ordinarily and desirably without observed formation of blooming or crazing, see infra.

The reaction product of the photocurable composition may be prepared by dispensing in low viscosity or liquid form a photocurable composition in accordance with the present invention onto a substrate and mating that substrate with a second substrate to form an assembly. Thereafter, exposure to electromagnetic radiation on at least one substrate of the assembly for an appropriate period of time should transform the photocurable composition into an adhesive reaction product.

It is also within the scope of the present invention for reaction products to be prepared from a photocurable composition separately from the device, and thereafter positioned on a substrate surface with which it is to be used. In this manner, such reaction products may desirably be fabricated, for instance, into a film or tape, such as an adhesive film or a coating film, which when applied to a chosen substrate will bond thereto. Many known film manufacturing processes may be employed to manufacture into films photocurable compositions in accordance with the present invention, including calendaring, casting, rolling, dispensing, coating, extrusion and thermoforming. For a non-exhaustive description of such processes, see *Modern Plastics Encyclopedia* 1988, 203–300, McGraw-Hill Inc., New York (1988). With respect to dispensing or coating, conventional techniques, such as curtain coating, spray coating, dip coating, spin coating, roller coating, brush coating or transfer coating, may be used.

A film of the photocurable composition may be prepared by extrusion or calendaring, where cure occurs by exposure to electromagnetic radiation prior to, contemporaneously with, or, if the composition is sufficiently viscous, after passing through the extruder or calendar. Thereafter, the film may be placed between the desired substrates, and construction of the device may be completed.

The viscosity of the photocurable composition may be controlled or modified to optimize its dispensability by, in addition to inclusion of an appropriate material to alter the viscosity thereof as noted above, adjusting the temperature of (1) the composition itself, or (2) the substrates on which the composition may be placed to assemble the device. For example, the temperature of the composition or the substrate(s) or combinations thereof may be decreased to increase the viscosity of the composition. In this way, the uniformity on the substrate of the dispensed photocurable composition may be enhanced using lamination techniques, centrifuge techniques, pressure applied from the atmosphere (such as with vacuum bagging), pressure applied from a weighted object, rollers and the like.

The substrates onto which the photocurable compositions of the present invention are intended to be dispensed may be constructed from the litany of materials recited supra, which may be substantially inflexible as well as flexible. The type of substrate chosen with respect to flexibility will of course depend on the application for which it is to be used. More specifically, the substrates may be constructed from substantially inflexible materials, such as glass, laminated glass, tempered glass, optical plastics, such as polycarbonates, acrylics and polystyrenes, and other alternatives as noted supra; and flexible materials, such as "MYLAR" film or polyolefin, such as polyethylene or polypropylene, tubing.

The choice of substrate material may influence the choice of processing technique used to prepare the photocurable composition into the cured reaction product or the type of device assembled. For example, when assembling a device from at least one flexible substrate, a composition may be advantageously applied to an end portion of the flexible substrate and allowed to wick along that end portion through a portion of another substrate, which is dimensioned to receive that end portion of the flexible substrate. A particular example of such an application is polyolefin tubing intended for medical application, one end portion of which is dimensioned for receiving by an acrylic luer housing.

In addition, roll-to-roll systems may be employed where flexible substrates are released from rolls (that are aligned and rotate in directions opposite to one another), and brought toward one another in a spaced-apart relationship. In this way, the photocurable composition may be dispensed or injected onto one of the flexible substrates at a point where the two flexible substrates are released from their respective rolls and brought toward one another, while being contemporaneously exposed to electromagnetic radiation for a time sufficient to cure the composition into an adhesive reaction product.

The dispensing of the composition may be effected through an injection nozzle positioned over one of the rolls of flexible substrate. By passing in the path of the nozzle as a continuously moving ribbon, a flexible substrate may be contacted with the composition in an appropriate amount and positioned on the flexible substrate.

Since the photocurable compositions of the present invention cure to form reaction products through, as their description connotes, a photo-initiated mechanism, the composition and the surface of the substrate on which the composition is placed should be exposed to the source of electromagnetic radiation. The choice of substrate may affect the rate and degree at which cure occurs of the photocurable compositions of the present invention. For instance, it is desirable for the substrates to be bonded together to be substantially free of electromagnetic radiation-absorbing capabilities. That is, the greater degree of electromagnetic radiation transmitting capability the substrate possesses, the greater the rate and degree of cure of the composition, all else being equal of course.

Blooming or crazing may be observed when compositions cure into reaction products and the cure itself is incomplete. That is, blooming refers to the evaporation of cyanoacrylate monomer (due to its relatively high vapor pressure) from uncured fillets, the result of which is formation of a precipitate on surfaces adjacent to the bond line which are also observed as a white haze. Crazing refers to the formation of stress cracks on certain synthetic materials, such as polycarbonates, acrylics and polysulfones, due in this instance to the presence thereon of cyanoacrylate monomer.

The result of incomplete curing may be observed with respect to adhesive uses of the photocurable composition as adhesive or cohesive failure of the cured composition when applied to or between substrates. Such observations may be minimized or even eliminated by using electromagnetic radiation transmitting (as contrasted to absorbing) substrates and placing the source of electromagnetic radiation at a strategic location so as to improve the degree of electromagnetic radiation to which the composition on the substrate is exposed. Similarly, additional sources of electromagnetic radiation, or as stated above reflectors which redirect onto desired portions of the substrate stray or errant electromagnetic radiation, may be employed to further enhance cure.

Accordingly, the compositions of this invention provide a number of benefits and advantages. These include: a built-in secondary cure system (i.e., photo-initiation in addition to the ordinary cyanoacrylate anionic initiation), which is particularly attractive in those applications where certain of the substrates which may be used in the assembly do not allow the transmission of light, rendering another type of adhesive (such as a dual cure acrylic adhesive) less desirable because a secondary heating step would then be required; elimination of a substrate primer step, which obviates the use of often flammable materials and invites automated processes; and improves the cure though gap.

In view of the above description of the present invention, it is evident that a wide range of practical opportunities is provided by the teaching herein. Certain of those practical opportunities are exemplified below, as are many of the advantages and benefits of the present invention. However, the invention as so exemplified is for illustrative purposes only and is not to be construed in any way as limiting the broad aspects of the teaching herein provided.

EXAMPLES

Example 1

A photocurable composition in accordance with the present invention was prepared from about 95.9 grams of ethyl-2-cyanoacrylate, about 0.1 grams of ferrocene and about 4 grams of "DAROCUR" 1173 as a photoinitiator. Typically, commercially available cyanoacrylate-containing compositions (such as "PRISM" Adhesive 4061, commercially available from Loctite Corporation, Rocky Hill, Conn.) are stabilized against premature anionic polymerization by the addition of an acidic material, such as boron trifluoride or methane sulfonic acid. In this example, therefore, the ethyl cyanoacrylate contained about 20 ppm of boron trifluoride as an acid anionic stabilizer. Of course, greater or lesser amounts of boron triflouride or other acidic anionic stabilizers may be added for such purpose.

In one instance, the three components were added directly to a polyethylene vessel and mixed for a period of time of about thirty minutes at room temperature. In another instance, the cyanoacrylate was added to the polyethylene vessel, and thereafter a premix of the ferrocene in the "DAROCUR" photoinitiator was added to the cyanoacrylate already in the vessel. Mixing in this latter instance was also allowed to continue for a period of time of about thirty minutes at room temperature.

Once the photocurable composition was prepared, a drop or bead (about 0.2 grams) thereof was dispensed using a polyethylene pipet onto an ultraviolet transmitting acrylic substrate (whose dimensions were about 1×1×0.25 inches, such as those available commercially from Industrial Safety Co.). More specifically, the composition was applied to one end portion of a substrate and thereafter a second substrate (each of which being constructed from the same material and having the same dimensions) was placed in a laterally displaced, offset position with respect thereto so as to cover that portion of the first substrate onto which the composition was placed. This application was performed in triplicate.

The two substrates were then clamped together using a small alligator clamp to form a test piece assembly, and thereafter introduced into a "ZETA" 7200 ultraviolet curing chamber, equipped with a five inch medium pressure mercury arc lamp (emitting light of a wavelength of about 300 to 365 nm). The clamped assembly was placed in the chamber under the lamp at a distance of about 2 to 3 inches, and exposed to the ultraviolet light emitted by the lamp for a period of time of from about five to about fifteen seconds as reflected below in Table 1.

After the indicated exposure time, the once-liquid composition was observed to have cured into a solid reaction product. The thickness of the cured material, or the bond line, was measured and determined to be about 1–3 mils. The data presented below in Table 1 reflects values obtained after a period of time of about 24 hours at ambient temperature conditions prior to testing.

Shear strength tests in accordance with the protocol set forth in ASTM D-1002 were performed on the cured test piece using an Instron Universal tester (Model 4206, Instron, Canton, Mass.). The Instron tester was used to measure the force required to separate those test pieces from one another. Instron measurements, commonly in the range of about 2500 to about 5000 psi, were obtained. The force measured translates into the bond strength of the cured reaction product, expressed in terms of pounds per square inch ("psi").

The limiting feature of the cured composition of the present invention appears to be the strength of the substrate on which it is applied and cured. The average measurements from the three test piece assembly specimens are presented below in Table 1.

The data presented for Sample Nos. 1–3 in Table 1 reflect compositions which were subjected to varying initial exposures to electromagnetic radiation and the shear strengths demonstrated by the reaction product as a result after a period of time of about 24 hours prior to Instron testing. A second photocurable composition in accordance with the present invention was prepared in the same manner with about 2 grams of "IRGACURE" 651 as a replacement for the "DAROCUR" photoinitiator, with the balance of the composition coming from additional "PRISM" Adhesive. Sample Nos. 4–6 in Table 1 reflect this second composition which were subjected to the indicated varying initial exposures to electromagnetic radiation.

TABLE 1

| Sample No. | Radiation Exposure (secs) | Shear Strength (after 24 hrs, psi) |
|---|---|---|
| 1 | 5 | 4057 |
| 2 | 10 | 3835 |
| 3 | 15 | 4846 |
| 4 | 5 | 4984 |
| 5 | 10 | 4293 |
| 6 | 15 | 3062 |

Tables 2a and 2b below are to be construed together and set forth several other photocurable composition formulations in accordance with the present invention prepared from "PRISM" Adhesive 4061 cyanoacrylate and 0.1% by weight ferrocene with the listed photoinitiators and amounts thereof, the cure process employed and certain properties and characteristics of the reaction products formed therefrom. Each of these formulations (i.e., Sample Nos. 7–10) was allowed to cure completely for a period of time of about 24 hours after initial exposure to ultraviolet light. The shear strength of the reaction products formed from those cured formulation is represented in Table 2b.

TABLE 2a

| Sample No. | Photoinitiator Type | Amt | Rad. Cure Type | Rad. Exp. (secs) |
|---|---|---|---|---|
| 7 | "DAROCUR" 1173 | 4% | UV | 10 |
| 8 | "IRGACURE" 651 | 2% | UV | 5 |
| 9 | "IRGACURE" 1700 | 2% | UV/VIS | 2 |
| 10 | "PRISM" Adh. 4061 (control) | — | — | — |

TABLE 2b

| | Shear strength (psi) | | | |
|---|---|---|---|---|
| | after 1–3 min Substrate Type. | | after 24 hours Substrate Type | |
| Sample No. | UV trans | UV abs | UV trans | UV abs |
| 7 | 3152 | 926 | 3591 | 2800 |
| 8 | 3352 | 1208 | 3021 | 3000 |
| 9 | 3292 | 2672 | 3,292 | 3198 |
| 10 | 42 | 147 | 1724 | 2624 |

In Table 2b, the shear strength was measured after exposure to electromagnetic radiation after a period of time of about 1 to about 3 minutes had elapsed and then again after a period of time of about 24 hours at ambient temperature conditions. Plainly, the shear strength measurements from the test piece assemblies constructed with the composition containing the "IRGACURE" 1700 photoinitiator (Sample No. 9) demonstrated a relatively small difference between test piece assemblies constructed from UV transmitting and UV absorbing substrates. And the shear strength measurements from test piece assemblies constructed with the UV absorbing substrates and the composition containing the "IRGACURE" 1700 photoinitiator was superior to that measured from the compositions containing either of the other two photoinitiators—"DAROCUR" 1173 (Sample No. 7) or "IRGACURE" 651 (Sample No. 8)—after the 1–3 minute time period indicated above. However, after a cure of about 24 hours, the measurements from each of the test piece assemblies constructed from UV transmitting or UV absorbing substrates and from each of the above-listed photoinitiators were all substantially within the same range, which was well above that of the control—"PRISM" Adhesive 4061 (Sample No. 10).

Example 2

In this example, a photoinitiator was used in the formulation which is capable of initiating polymerization irrespective of whether the substrate used is constructed from a UV transmitting material or a UV absorbing material. That is, the photoinitiator may be initiated by radiation in the visible region of the electromagnetic spectrum.

More specifically, three formulations were prepared from "PRISM" Adhesive 4061 together with about 0.1% by weight of ferrocene and about 0.5% by weight to about 2% by weight of "IRGACURE" 1700 as a photoinitiator. The amount of "PRISM" Adhesive 4061 (containing ethyl-2-cyanoacrylate) chosen is within the range of about 97.9% by weight to about 99.4% by weight of the composition. A fourth formulation consisted only of the "PRISM" Adhesive 4061 and was used as a control.

The formulations were prepared and applied to "s/p" micro slides (commercially available from Baxter Corporation, Deerfield, Ill.), which were then positioned in the "ZETA" 7200 UV curing chamber. The formulations were each observed to cure on the glass slides in a time period of about 2 to 3 seconds.

The formulations were then applied to acrylic substrates, both of the UV absorbing and the UV transmitting type. The formulations were applied to two sets of test piece specimens in triplicate of both UV absorbing acrylic substrates and UV transmitting acrylic substrates, which were mated to form test piece assemblies. The so-formed assemblies were then positioned in the UV curing chamber and exposed to UV radiation for the following time periods: about 1, 2 and 5 seconds. Thereafter, the test piece assemblies were maintained at ambient temperature conditions for a period of time of about 1 to 3 minutes and shear strength measurements of each test piece assembly were determined using the Instron Universal tester, as described in Example 1, supra. The second set of triplicate specimens was allowed to cure further at ambient temperature conditions for a period of time of about 24 hours. Failure in these specimens may occur due either to substrate failure (e.g., substrate fracture), cohesive failure (e.g., where a portion of the photocurable composition separates due to the applied force on surfaces of both substrates) or adhesive failure (e.g., where the composition separates due to the applied force on a surface of one substrate).

The first formulation contained about 2% by weight of "IRGACURE" 1700, and the UV transmitting test piece which was exposed to UV radiation for 1 second demonstrated a shear strength of about 2552 psi with adhesive and cohesive failure; the corresponding UV absorbing test piece assembly demonstrated a shear strength of about 864 psi with cohesive failure. The UV transmitting test piece which was exposed to UV radiation for 2 seconds demonstrated a shear strength of about 3292 psi with adhesive and substrate failure; the corresponding UV absorbing test piece demonstrated a shear strength of about 2672 psi with adhesive and substrate failure. The UV transmitting test piece which was exposed to UV radiation for 5 seconds demonstrated a shear strength of about 2910 psi with adhesive failure; the corresponding UV absorbing test piece demonstrated a shear strength of about 1698 psi with adhesive and substrate failure.

The UV transmitting test piece which was exposed to UV radiation for 1 second and thereafter allowed to cure further for 24 hours demonstrated a shear strength of about 2572 psi with adhesive failure; the corresponding UV absorbing test piece assembly demonstrated a shear strength of about 2466 psi with adhesive failure. The UV transmitting test piece which was exposed to UV radiation for 2 seconds and thereafter allowed to cure further for 24 hours was observed to not change with respect to shear strength; the corresponding UV absorbing test piece demonstrated a shear strength of about 3198 psi with substrate failure. The UV transmitting test piece which was exposed to UV radiation for 5 seconds and thereafter allowed to cure further for 24 hours demonstrated a shear strength of about 3812 psi with substrate failure; the corresponding UV absorbing test piece demonstrated a shear strength of about 3502 psi with substrate failure.

The second formulation contained about 1% by weight of "IRGACURE" 1700, and the UV transmitting test piece which was exposed to UV radiation for 1 second demonstrated a shear strength of about 1272 psi with adhesive failure; the corresponding UV absorbing test piece assembly demonstrated a shear strength of about 430 psi with cohesive failure. The UV transmitting test piece which was exposed to UV radiation 2 seconds demonstrated a shear strength of about 2808 psi with adhesive and cohesive failure; the corresponding UV absorbing test piece demonstrated a shear strength of about 2334 psi with adhesive and substrate failure. The UV transmitting test piece which was exposed to UV radiation for 5 seconds demonstrated a shear strength of about 2208 psi with adhesive failure; the corresponding UV absorbing test piece demonstrated a shear strength of about 1832 psi with adhesive and cohesive failure.

The UV transmitting test piece which was exposed to UV radiation for 1 second and thereafter allowed to further cure for 24 hours demonstrated a shear strength of about 2828 psi with adhesive and substrate failure; the corresponding UV absorbing test piece assembly demonstrated a shear strength of about 1742 psi with cohesive failure. The UV transmitting test piece which was exposed to UV radiation 2 seconds and thereafter allowed to cure further for 24 hours demonstrated a shear strength of about 2808 psi with adhesive and cohesive failure; the corresponding UV absorbing test piece demonstrated a shear strength of about 2538 psi with adhesive and substrate failure. The UV transmitting test piece which was exposed to UV radiation for 5 seconds and thereafter allowed to cure further for 24 hours demonstrated a shear strength of about 2004 psi with cohesive failure; the corresponding UV absorbing test piece demonstrated a shear strength of about 3524 psi with substrate failure.

The third formulation contained about 0.5% by weight of "IRGACURE" 1700, and the UV transmitting test piece which was exposed to UV radiation for 1 second demonstrated a shear strength of about 1776 psi with adhesive failure; the corresponding UV absorbing test piece assembly was not observed to cure. The UV transmitting test piece which was exposed for 2 seconds demonstrated a shear strength of about 1830 psi with cohesive failure; the corresponding UV absorbing test piece demonstrated a shear strength of about 654 psi also with cohesive failure. The UV, transmitting test piece which was exposed to UV radiation for 5 seconds demonstrated a shear strength of about 2064 psi with adhesive and cohesive failure; the corresponding UV absorbing test piece demonstrated a shear strength of about 1904 psi with adhesive and cohesive failure.

The UV transmitting test piece which was exposed to UV radiation for 1 second and thereafter allowed to cure further for 24 hours demonstrated a shear strength of about 3124 psi with adhesive and substrate failure; the corresponding UV absorbing test piece assembly was again observed not to cure. The UV transmitting test piece which was exposed for 2 seconds and allowed to cure further for 24 hours demonstrated a shear strength of about 1830 psi with cohesive failure; the corresponding UV absorbing test piece demonstrated a shear strength of about 2820 psi with adhesive and substrate failure. The UV transmitting test piece which was exposed to UV radiation for 5 seconds and thereafter allowed to cure further for 24 hours demonstrated a shear strength of about 2190 psi with adhesive and cohesive failure; the corresponding UV absorbing test piece demonstrated a shear strength of about 3128 psi with substrate failure.

As a control composition, "PRISM" Adhesive 4061 cyanoacrylate adhesive was also applied to both UV transmitting and UV absorbing test pieces. Exposure of both UV transmitting and UV absorbing test pieces to UV radiation for 5 seconds resulted in shear strength measurements of about 13 psi and 14 psi, respectively. Values of this order of magnitude effectively mean that the composition did not cure. After a period of about 24 hours at ambient temperature conditions, the UV transmitting test piece assembly demonstrated a shear strength of about 1724 psi and the UV absorbing test piece assembly demonstrated a shear strength of about 2624 psi.

Example 3

In this example, additional compositions in accordance with the present invention were prepared and evaluated for their speed of cure, stability, and bond strength.

Table 3 below shows the components of these compositions.

TABLE 3

| Sample No. | Components | Amounts (wt %) |
|---|---|---|
| 11 | Ethyl-2-cyanoacrylate | 99.495 |
|  | Ferrocene | 0.005 |
|  | "IRGACURE" 819 | 0.5 |
| 12 | Ethyl-2-cyanoacrylate | 98.99 |
|  | $Cp_2HfCl_2$ | 0.0114 |
|  | "IRGACURE" 1700 | 1 |
| 13 | Ethyl-2-cyanoacrylate | 99.48 |
|  | $Py_2RuCl_2$ | 0.0228 |
|  | "IRGACURE" 1700 | 0.5 |
| 14 | Ethyl-2-cyanoacrylate | 98.99 |
|  | Diferrocenyl ethane | 0.0108 |
|  | "IRGACURE" 1700 | 1 |
| 15 | Ethyl-2-cyanoacrylate | 98.98 |
|  | $Cp_2MoCl_2$ | 0.0166 |
|  | "IRGACURE" 1700 | 1 |
| 16 | Ethyl-2-cyanoacrylate | 98.98 |
|  | $Cp_2TiCl_2$ | 0.016 |
|  | "IRGACURE" 1700 | 1 |
| 17 | Ethyl-2-cyanoacrylate | 98.97 |
|  | $Cp_2ZrCl_2$ | 0.0288 |
|  | "IRGACURE" 1700 | 1 |
| 18 | Ethyl-2-cyanoacrylate | 99.48 |
|  | PtACAC | 0.02 |
|  | "IRGACURE" 1700 | 0.5 |

TABLE 3-continued

| Sample No. | Components | Amounts (wt %) |
|---|---|---|
| 19 | Ethyl-2-cyanoacrylate | 98.99 |
|  | Ferrocene | 0.01 |
|  | Methyl pyruvate | 1 |

In Table 3, $Cp_2$ represents dicyclopentadienyl and $Py_2$ represents bis(2-pyridyl). In addition, to the ethyl-2-cyanoacrylate has been added about 50 ppm of $BF_3$ and about 1000 ppm of hydroquinone to minimize premature anionic polymerization and free-radical formation, respectively.

Sample Nos. 11–19 were prepared along the lines of the samples described in Example 1, supra.

Once prepared, about 10 mg of each sample was placed in an aluminum pan and exposed to UV radiation emitted by a medium pressure mercury lamp (10 mW/cm$^2$ intensity at a 365 nm wavelength). The exposure occurred for a period of time of about 10 minutes under isothermal conditions at a temperature of about 30° C.

The data shown below in Table 4 provides information on Sample Nos. 11–19 regarding their ability to cure when exposed to electromagnetic radiation. The response for these samples was determined with a DuPont 930 Differential Photo Calorimeter ("DPC") to which was attached an Oriel 68805 universal power supply.

The induction time and peak max time is the time of UV exposure required to induce a photo-curing reaction and to reach a reaction maximum, respectively. These data are measured by onset and peak time of the reaction enthalphy (or exothermic photo-curing reaction). Higher enthalphy indicates the sample has a greater reactivity. Of course, a faster curing sample will have a shorter induction time, a peak max time and a higher enthalpy. For example, Sample 11 required 1.1 seconds of such UV exposure to induce UV curing, 4 seconds to reach a UV curing reaction maximum and generated 164 J/G of exotheric heat.

TABLE 4

| Sample No. | Induction Time (secs) | Peak Max (secs) | Enthalpy (J/G) |
|---|---|---|---|
| 11 | 1.1 | 4 | 164 |
| 12 | 14.5 | 629 | 406 |
| 13 | 6.1 | 11.2 | 278 |
| 14 | 1.7 | 4.8 | 204 |
| 15 | 4.3 | 8.2 | 277 |
| 16 | 16.6 | 531 | 224 |
| 17 | 18.6 | 221 | 309 |
| 18 | 12.2 | 88 | 419 |
| 19 | 24 | 172 | 355 |

As a control, ethyl-2-cyanoacrylate was exposed to UV radiation under the same conditions as the other samples, and no polymerization reaction was observed to occur.

Example 4

In this example, one-part compositions according to the present invention were prepared with a variety of viscosities and photoinitiators for comparative purposes.

Table 5 below shows the components of these compositions.

TABLE 5

| Sample No. | Components | Amounts (wt %) |
|---|---|---|
| 20 | Ethyl-2-cyanoacrylate | 88.995 |
|  | Ferrocene | 0.005 |
|  | PMMA | 10.5 |
|  | "IRGACURE" 1700 | 0.5 |
| 21 | Ethyl-2-cyanoacrylate | 92.495 |
|  | Ferrocene | 0.005 |
|  | PMMA | 7 |
|  | "IRGACURE" 1700 | 0.5 |
| 22 | Ethyl-2-cyanoacrylate | 92.495 |
|  | Ferrocene | 0.005 |
|  | PMMA | 7 |
|  | "IRGACURE" 819 | 0.5 |
| 23 | Ethyl-2-cyanoacrylate | 98.995 |
|  | Ferrocene | 0.005 |
|  | "DAROCUR" 1173 | 1 |
| 24 | Ethyl-2-cyanoacrylate | 99.495 |
|  | Ferrocene | 0.005 |
|  | "IRGACURE" 1700 | 0.5 |

In Table 5, PMMA represent poly(methyl methacrylate).

Sample Nos. 20–24 were also prepared along the lines of the samples described in Example 1, supra.

Once prepared, about 10 mg of each sample was placed in an aluminum pan and exposed to UV radiation emitted by a medium pressure mercury lamp (10 mw/cm$^2$ intensity at a 365 nm wavelength). The exposure occurred for a period of time of about 10 minutes under isothermal conditions at a temperature of about 30° C.

The data shown below in Table 6 provides information on Sample Nos. 20–24 regarding their ability to cure when exposed to electromagnetic radiation. The response for these samples was again determined with the DuPont 930 DPC.

As a control, a PMMA-thickened ethyl-2-cyanoacrylate was exposed to UV radiation under the same conditions as the other samples, and no polymerization reaction was observed to occur.

TABLE 6

| Sample No. | Induction Time (secs) | Peak Max (secs) | Enthalpy (J/G) |
|---|---|---|---|
| 20 | 1.9 | 4.6 | 252 |
| 21 | 17 | 5 | 208 |
| 22 | 1.1 | 4 | 203 |
| 23 | 5 | 17 | 282 |
| 24 | 1.3 | 4.2 | 194 |

The bond strength for the cured reaction product of each sample is set forth in Table 7 below.

TABLE 7

| | Block Sheer Strength | |
|---|---|---|
| Sample No. | @ 2 mins RT Cure | @ 24 hrs RT Cure |
| 20 | 1407 | 1637 |
| 21 | 1416 | 1951 |
| 22 | 1851 | 1815 |
| 23 | — | — |
| 24 | — | — |

Example 5

The photocurable compositions of the present invention may be used in far flung manufacturing opportunities.

For instance, a variety of equipment for the medical industry may be manufactured using the inventive compositions, including, but not limited to, needles, tubesets, makes and catheters.

With respect to needles, syringes, lancets, hypodermics, injectors, bodily fluid (such as blood or urine) collector sets, cannula/hub assemblies and cannula/tube assemblies, such as those to be used in connection with dialysis processes are but a few examples of needles for the medical industry which may be manufactured with the composition of this invention.

Generally, in the manufacture of needles for which a cannula is inserted into a cavity within a hub and is to be affixed therein, dispensing a pre-determined amount of the inventive compositions and subjecting the assembly to UV radiation allows a quick fixation which will cure through the shadow area by the ordinary cyanoacrylate anionic cure mechanism to a full-strength bond within 24 hours.

Moreover, with respect to those needle assemblies which aim at being tamper proof and which provide a cap, the inventive composition may be placed at the juncture between the cap and the collar in which may be placed a hub.

In addition, with respect to tubesets, intravenous sets, fluid delivery and withdrawl sets (such as drug delivery and blood withdrawal sets) and suction tubes are but a few examples of tubesets for the medical industry which may be manufactured with the composition of this invention.

In such instances, tubesets and connectors may be assembled with the inventive compositions by inserting one end of the tubing into the appropriate housing of a connector.

Avoiding the use of a primer composition is particularly attractive since solvents used in conventional primer compositions may cause the reaction product formed from conventional reactive adhesive compositions to be brittle and more susceptible to stress cracking. In contrast, the photocurable feature of the compositions of this invention allow the parts to become fixtured quickly, thereby permitting the conventional anionic-initiated cyanoacrylate cure mechanism to occur without fear of compromising the integrity of the bond formed.

Also, with respect to masks, anesthesia, face and surgical masks are but a few examples of equipment worn by providers of medical services, which may be manufactured with the composition of this invention.

And, with respect to catheters, angioplast and balloon-type catheters are but a few examples of types of catheters, which may be manufactured with the compositions of this invention.

Of course, other applications for the compositions of the present invention exist beyond those specifically exemplified above and are contemplated within the scope thereof, including, but not limited to, silk screening or disc drive applications; holographic applications where a phase hologram is prepared for optical information storage; magnetic sensor applications for door/window alarms where the magnet is bonded to the sensor housing using the inventive compositions so that the dead space within the housing is filled; attaching gauge needles to support posts (e.g., in automotive applications); bonding together cardboard holding cartridges for batteries; loud speaker assembly [see e.g., in the context of Loctite "PRISM" Adhesive 4204, "Beyond a Simple Bond—Benefits of Adhesives Extend to Product and Process", *Design News* (Jan. 20, 1997)] for which the inventive compositions may be used in at least five aspects of the assembly—attaching the spider (which aligns the voice coil to the magnet) to the frame, attaching the surround (which is connected to the case) to the frame, tacking the lead wires, attaching the dust cap to the cone, and attaching the voice coil to the spider and the cone; lens bonding applications; applications where blooming and crazing would be aesthetically unacceptable from a commercial perspective, such as in jewelry fabrication and repair applications where use of a thick fillet of cured material (such as a reaction product of the inventive compositions) would be desirable for structural mounting; electronic potting applications; and other applications where it would be desirable to obviate the need for the use of a primer material (which may be costly, contain an ozone-depleting material and/or may complicate the assembly process), for instance, the fastening of electronic wire tacking, and the like.

Also, electronic applications where outgassing is a conventional recurring problem may employ the photocurable compositions of this invention to decrease the heating time required to obtain a fully-cured reaction product of the composition, thereby decreasing outgassing which may occur.

While the present invention has been exemplified as shown above, it is clear that variations are also intended to be within the spirit and scope of the present invention and may be practiced in accordance herewith, with only routine, rather than undue, experimentation. Any variations and equivalents should provide suitable, if not comparable results, when viewed in connection with the results obtained from the above examples. Accordingly, such variations and equivalents are also intended to be encompassed by claims which follow.

What is claimed is:

1. A composition comprising:

(a) a 2-cyanoacrylate monomer of the formula $H_2C=C(CN)-COOR$, wherein R is selected from the group consisting of $C_{1-15}$ alkyl, alkoxyalkyl, cycloalkyl, alkenyl, aralkyl, aryl, allyl and haloalkyl groups, (b) a metallocene component, (c) a polymerisingly effective amount of a photoinitiator component other than the metallocene component to render the composition capable of photocuring in air upon exposure to at least one type of electromagnetic radiation selected from the group consisting of ultraviolet light, visible light, electron beam, x-ray and infrared radiation, (d) one or more sulfur-containing compounds selected from the group consisting of sulfonates, sulfinates, sulfates, and sulfites, and (e) polymethyl methacrylate.

2. The composition according to claim 1, wherein the 2-cyanoacrylate monomer is selected from the group consisting of methyl cyanoacrylate, ethyl-2-cyanoacrylate, propyl cyanoacrylates, butyl cyanoacrylates, octyl cyanoacrylates, allyl-2-cyanoacrylate, β-methoxyethyl-2-cyanoacrylate and combinations thereof.

3. The composition according to claim 1, wherein the 2-cyanoacrylate monomer is ethyl-2-cyanoacrylate.

4. The composition according to claim 1, wherein the metallocene component includes materials within the following structure:

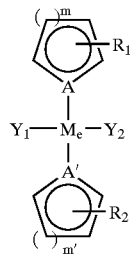

wherein $R_1$ and $R_2$ occur at least once on each ring, are the same or different and are selected from the group consisting of H; any straight- or branched-chain alkyl constituent having from 1 to about 8 carbon atoms; acetyl; vinyl; allyl; hydroxyl; carboxyl; —$(CH_2)_n$—OH, wherein n is an integer in the range of 1 to about 8; —$(CH_2)_n$—$COOR_3$, wherein n is an integer in the range of 1 to about 8 and $R_3$ is a member selected from the group consisting of H; any straight- or branched-chain alkyl constituent having from 1 to about 8 carbon atoms; —$(CH_2)_{n'}$, wherein n' is an integer in the range of 2 to about 8; and —$(CH_2)_n$—$OR_4$, wherein n is an integer in the range of 1 to about 8 and $R_4$ is any straight- or branched-chain alkyl constituent having from 1 to about 8 carbon atoms;

$Y_1$ and $Y_2$ are optional and when present at least once are the same or different and are selected from the group consisting of H, Cl, Br, I, cyano, methoxy, acetyl, hydroxy, nitro, trialkylamines, triaryamines, trialkylphospines, triphenylamine, and tosyl;

A and A' are the same or different and are C or N;

m and m' are the same or different and are 1 or 2; and $M_e$ is a member selected from the group consisting of Fe, Ti, Ru, Co, Ni, Cr, Cu, Mn, Pd, Ag, Rh, Pt, Zr, Hf, Nb, V and Mo.

5. The composition according to claim 1, wherein the metallocene component includes materials within the following structure:

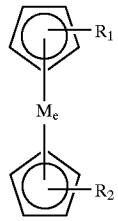

wherein $R_1$ and $R_2$ are the same or different, and each is a member selected from the group consisting of H; any straight- or branched-chain alkyl constituent having from 1 to about 8 carbon atoms, acetyl; vinyl; allyl; hydroxyl; carboxyl; —$(CH_2)_n$—OH, wherein n is an integer in the range of 1 to about 8; —$(CH_2)_n$—$COOR_3$, wherein n is an integer in the range of 1 to about 8 and $R_3$ is a member selected from the group consisting of any straight- or branched-chain alkyl constituent having from 1 to about 8 carbon atoms, H, or —$(CH_2)_{n'}$, wherein n' is an integer in the range of 2 to about 8; and —$(CH_2)_n$—$OR_4$, wherein n is an integer in the range of 1 to about 8 and $R_4$ is any straight or branched-chain alkyl constituent having from 1 to about 8 carbon atoms; and $M_e$ is a member selected from the group consisting of Fe, Ti, Ru, Co, Ni, Cr, Zr, Hf, Nb, V and Mo.

6. The composition according to claim 4, wherein $M_e$ is selected from the group consisting of Ti, Cr, Cu, Mn, Ag, Zr, Hf and Mo.

7. The composition according to claim 1, wherein the metallocene component includes materials within the following structure:

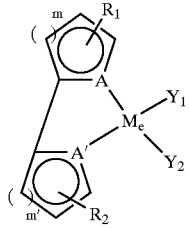

wherein $R_1$ and $R_2$ occur at least once on each ring, are the same or different and are selected from the group consisting of H; any straight- or branched-chain alkyl constituent having from 1 to about 8 carbon atoms; acetyl; vinyl; allyl; hydroxyl; carboxyl; —$(CH_2)_n$—OH, wherein n is an integer in the range of 1 to about 8; —$(CH_2)_n$—$COOR_3$, wherein n is an integer in the range of 1 to about 8 and $R_3$ is a member selected from H; any straight- or branched-chain alkyl constituent having from 1 to about 8 carbon atoms; —$(CH_2)_{n'}$, wherein n' is an integer in the range of 2 to about 8; and —$(CH_2)_n$—$OR_4$, wherein n is an integer in the range of 1 to about 8 and $R_4$ is any straight- or branched-chain alkyl constituent having from 1 to about 8 carbon atoms;

$Y_1$ and $Y_2$ are optional and when present at least once are the same or different and are selected from from the group consisting of H, Cl, Br, I, cyano, methoxy, acetyl, hydroxy, nitro, trialkylamines, triaryamines, trialkylphospines, triphenylamine, and tosyl;

A and A' are the same or different and are C or N;

m and m' are the same or different and are 1 or 2; and $M_e$ is selected from the group consisting of Fe, Ti, Ru, Co, Ni, Cr, Cu, Mn, Pd, Ag, Rh, Pt, Zr, Hf, Nb, V and Mo.

8. The composition according to claim 7, wherein $R_1$ and $R_2$ are each H; $Y_1$ and $Y_2$ are each Cl; A and A' are each N; m and m' are each 2; and Me is Ru.

9. The composition according to claim 1, wherein the metallocene component is selected from the group consisting of diaryl phosphino metal-complexed ferrocenes, bisalkyl ferrocenes, and $M_e[CW_3$—CO—CH=C(O$^-$)—$CW'_3]_2$, wherein $M_e$ is a member selected from the group consisting of Fe, Ti, Ru, Co, Ni, Cr, Cu, Mn, Pd, Ag, Rh, Pt, Zr, Hf, Nb, V and Mo, and W and W' are the same or different and are selected from the group consisting of H and halogen.

10. The composition according to claim 1, wherein the metallocene component is a member selected from the group consisting of ferrocenes, titanocenes, and combinations thereof.

11. The composition according to claim 1, wherein the metallocene component is ferrocene.

12. The composition according to claim 1, wherein the photoinitiator component is selected from the group consisting of 1-hydroxycyclohexyl phenyl ketone, 2-methyl-1-2-morpholino propan-1-one, benzophenone, 2-benzyl-2-N, N-dimethylamino-1-(4-morpholinophenyl)-1-butanone, 2,2-dimethoxy-2-phenyl acetophenone, bis(2,6-dimethoxybenzoyl-2,4,4-trimethyl pentyl)phosphine oxide, 2,4,6-trimethylbenzoyldiphenyl-phosphine oxide, bis(2,4,6-trimethyl benzoyl)phenyl phosphine oxide, 2-hydroxy-2-methyl-1-phenyl-propan-1-one, alkyl pyruvates, aryl pyruvates and combinations thereof.

13. The composition according to claim 1, wherein the photoinitiator is a member selected from the group consisting of UV photoinitiators, visible light photoinitiators, UV/visible light photoinitiators, and combinations thereof.

14. The composition according to claim 1, wherein the photoinitiator is a member selected from the group consiting of dl-camphorquinone, bis($\eta^s$-2,4-cyclopentadien-1-yl)-bis[2,6-difluoro-3-(1H-pyrrol-1-yl)phenyl)titanium, and combinations thereof.

15. The composition according to claim 1, further comprising a member selected from the group consisting of viscosity-modifying agents, rubber toughening agents, thixotropy rendering agents, thermal stabilizing agents and combinations thereof.

16. The composition according to claim 1, wherein the cyanoacrylate monomer includes ethyl-2-cyanoacrylate which is present in an amount within the range of about 97.9% by weight to about 99.4% by weight of the total composition, the metallocene component is ferrocene which is present in an amount of about 0.1% by weight of the total composition, the photoinitiator component includes the combination of bis(2,6-dimethoxybenzoyl-2,4,4-trimethyl) pentyl phosphine oxide and 2-hydroxy-2-methyl-1-phenyl-propan-1-one which is present in an amount in the range of about 0.5% to about 2% by weight of the total composition, and the sulfur-containing compound is present in an amount in the range of about 0.1% to about 10% by weight of the total composition.

17. The composition according to claim 1, wherein the cyanoacrylate component includes: ethyl-2-cyanoacrylate which is present in an amount within the range of about 98.715% to about 98.75% by weight of the total composition and $BF_3$ in an amount within the range of about 0.04% to about 0.075% by weight of the total composition, the metallocene component is ferrocene which is present in an amount of about 0.02% by weight of the total composition, the photoinitiator component includes the combination of bis(2,6-dimethoxybenzoyl-2,4,4-trimethyl)pentyl phosphine oxide and 2-hydroxy-2-methyl-1-phenyl-propan-1-one which is present in an amount of about 1.2% by weight of the total composition, and the sulfur-containing compound is present in an amount in the range of about 0.1% to about 10% by weight of the total composition.

18. The composition according claim 1 in a one-part formulation.

19. The composition according to claim 18, for use in the manufacture of articles using a wicking application.

20. The composition according to claim 1, wherein the composition is useful as an adhesive, a sealant or a coating.

21. The composition according to claim 1, for use in the manufacture of articles having molded polymeric parts to be bonding together.

22. The composition according to claim 1, for use in the manufacture of articles having porous substrates with gaps greater than about 0.5 mil therebetween.

23. The composition according to claim 1, which cures to provide a non-tacky surface in less than 5 seconds.

24. A method of polymerizing a composition, said method comprising the steps of:
 (a) providing an amount of the composition according to claim 1: and (b) subjecting the composition to a sufficient amount of said electromagnetic radiation to cure the composition.

25. A reaction product formed from the composition according to claim 1, after exposing the composition to electromagnetic radiation effecting to cure the composition.

26. An article assembled with a composition according to claim 1, selected from the group consisting of needles, syringes, lancets, hypodermics, injectors, bodily fluid collector sets, cannula/hub assemblies, cannula/tube assemblies, tube sets, intravenous sets, fluid delivery and withdrawal sets, suction tubes, anesthesia masks, face masks, surgical masks, angioplast catheters, balloon catheters, disc drives, magnetic sensors, battery holding cartridges, loud speakers, phase holograms, lenses and jewelry, wherein the composition is cured by exposure to at least one type of electromagnetic radiation selected from the group consisting of ultraviolet light, visible light, electron beam, x-ray and infrared radiation.

27. A method of manufacturing an article comprising:
 selecting portions of needles, syringes, lancets, hypodermics, injectors, bodily fluid collector sets, cannula/hub assemblies, cannula/tube assemblies, tube sets, intravenous sets, fluid delivery and withdrawal sets, suction tubes, anesthesia masks, face masks, surgical masks, angioplast catheters, balloon catheters, disc drives, magnetic sensors, battery holding cartridges, loud speakers, phase holograms, lenses or jewelry;
 applying a composition according to claim 1 to said portions; and
 polymerizing said composition to thereby assemble said portions.

28. A method of repairing an article, comprising:
 selecting a broken article selected from the group consisting of needles, syringes, lancets, hypodermics, injectors, bodily fluid collector sets, cannula/hub assemblies, cannula/tube assemblies, tube sets, intravenous sets, fluid delivery and withdrawal sets, suction tubes, anesthesia masks, face masks, surgical masks, angioplast catheters, balloon catheters, disc drives, magnetic sensors, battery holding cartridges, loud speakers, phase holograms, lenses and jewelry;
 applying a composition according to claim 1 to said broken article; and
 polymerizing said composition to thereby repai said broken article.

29. A method of using a one-part composition according to claim 18 in the assembly of an article which ordinarily would be assembled by applying onto a substrate a primer, followed by an adhesive composition, comprising:
 selecting portions of needles, syringes, lancets, hypodermics, injectors, bodily fluid collector sets, cannula/hub assemblies, cannula/tube assemblies, tube sets, intravenous sets, fluid delivery and withdrawal sets, suction tubes, anesthesia masks, face masks, surgical masks, angioplast catheters, balloon catheters, disc drives, magnetic sensors, battery holding cartridges, loud speakers, phase holograms, lenses or jewelry;
 applying a composition according to claim 1 to said portions; and
 polymerizing said composition to thereby assemble said portions.

* * * * *